(12) United States Patent
Courtney

(10) Patent No.: US 6,385,772 B1
(45) Date of Patent: May 7, 2002

(54) MONITORING SYSTEM HAVING WIRELESS REMOTE VIEWING AND CONTROL

(75) Inventor: Jonathan D. Courtney, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/292,501

(22) Filed: Apr. 15, 1999

Related U.S. Application Data

(60) Provisional application No. 60/083,644, filed on Apr. 30, 1998.

(51) Int. Cl.[7] .................................................. H04N 7/18
(52) U.S. Cl. ........................ 725/105; 348/143; 348/152; 348/153
(58) Field of Search ................................ 348/143, 144, 348/148, 149, 152, 153, 154, 155, 159; 725/105; H04N 7/18

(56) References Cited

U.S. PATENT DOCUMENTS

| | | | |
|---|---|---|---|
| 4,943,854 A | 7/1990 | Shiota et al. | 348/159 |
| 5,111,291 A | 5/1992 | Erickson et al. | 348/152 |
| 5,491,511 A | 2/1996 | Odle | 348/153 |
| 6,084,510 A * | 7/2000 | Lemelson et al. | 348/143 |

OTHER PUBLICATIONS

Jonathan D. Courtney, "Automatic Video Indexing via Object Motion Analysis", *Pattern Recognition*, Apr., 1997, cover page and pp. 1–31.

Niyogi, et al., "Analyzing and Recognizing Walking Figures in XYT", 1994 IEEE, pp. 469–474.

Wren, et al., "Pfinder: Real–Time Tracking of the Human Body", M.I.T. Media Laboratory Perceptual Computing Section Technical Report No. 353, published in SPIE 1995 vol. 2615, pp. 1–9.

Turk, et al., "Eigenfaces for Recognition", 1991 Massachusetts Institute of Technology, Journal of Cognitive Neuroscience vol. 3, No. 1, pp. 71–86.

Flinchbaugh, et al., "Autonomous Scene Monitoring System", pp. 205–209.

Norris, et al., "Algorithmic Surveillance—The future of automated visual surveillance", CCTV, Surveillance and Social Control Conference, Jul. 9, 1996, pp. 1–21.

Jonathan D. Courtney, "Automatic Object–Based Indexing for Assisted Analysis of Video Data", (1995) pp. 1–25.

Bruce Flinchbaugh, "Robust Video Motion Detection and Event Recognition", May 11, 1997, pp. 51–54.

Kashi Rao, "A Computer Vision System to Detect 3–D Rectangular Solids", 6 unnumbered pages.

(List continued on next page.)

*Primary Examiner*—Howard Britton
(74) *Attorney, Agent, or Firm*—Robert D. Marshall, Jr.; W. James Brady, III; Frederick J. Telecky, Jr.

(57) ABSTRACT

A monitoring apparatus (10) includes a video camera (12) with a section (16) that permits remote control of the camera. A computer 24 subjects video images from the camera to video processing (61–63), which includes temporal sampling, spatial sampling, and dithering. The processed image (71) is integrated into a document in hypertext mark-up language format. A portable unit (46) is operatively coupled to the computer through a wireless link (49), a cellular base station (36), and a network (38) or telephone line (41). An infrared sensor (19) can detect an event of interest in the monitored area, causing the computer to place a telephone call to the portable unit. The person possessing the portable unit can then use the portable unit to access the document which contains the processed image through the network, in order to observe or verify the event. The person can also use the portable unit to remotely control the operation of the video camera.

18 Claims, 2 Drawing Sheets

OTHER PUBLICATIONS

Jain, et al., "Segmentation through the Detection of Changes Due to Motion", Computer Graphics and Image Processing 11, (1979), pp. 13–34.

"DTS–1000 DTS–1000VB Video Motion Detection & Tracking System" Stellar Security Products Incorporated, 4 unnumbered pages, 1995.

Olson, et al., "Moving Object Detection and Event Recognition Algorithms for Smart Cameras", May 11, 1997, pp. 159–175.

"NOKIA 900 Communicator", Products, one page.

* cited by examiner

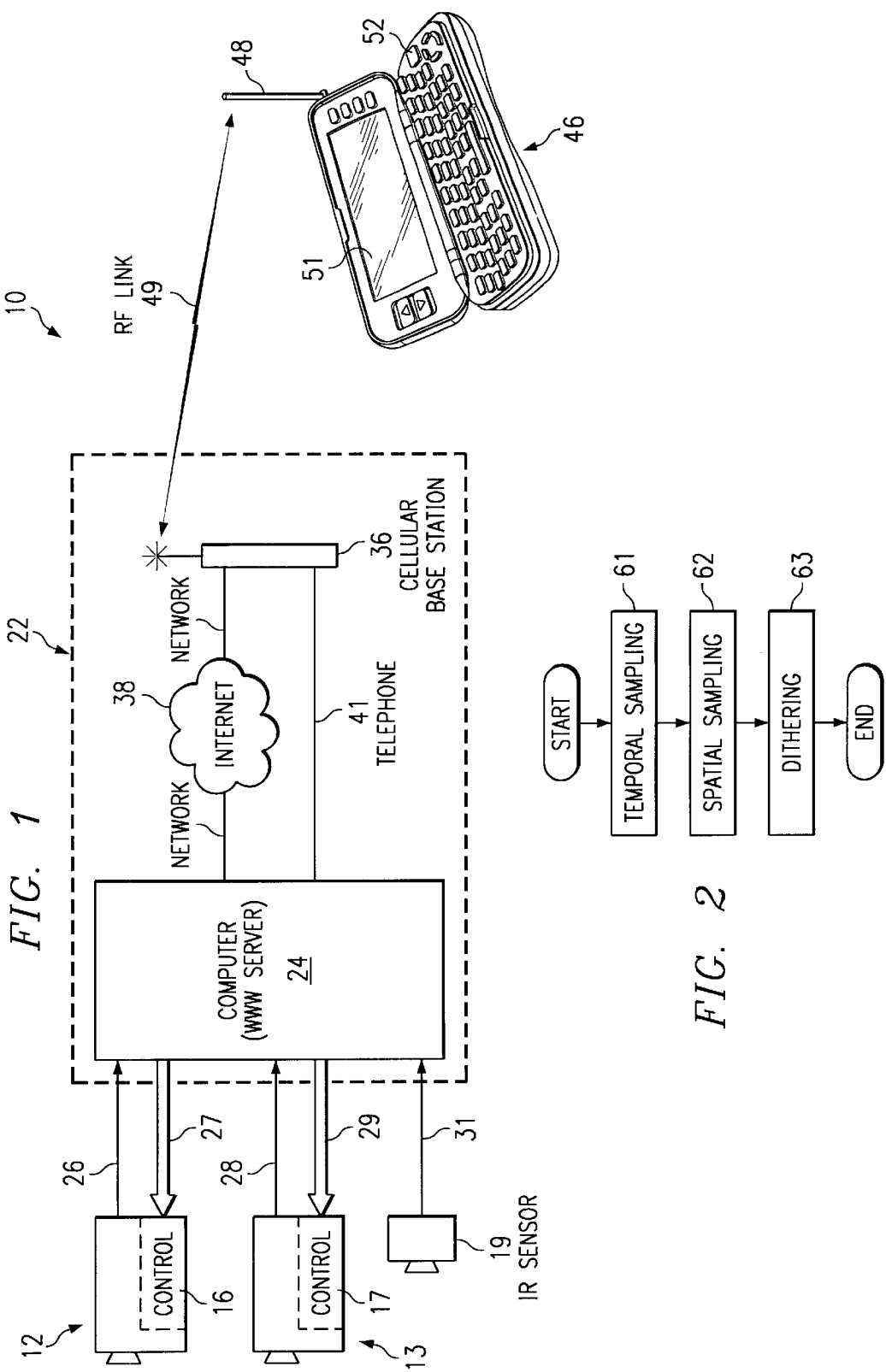

MONITORING SYSTEM HAVING WIRELESS REMOTE VIEWING AND CONTROL

This application claims priority under 35 USC §119(e)(1) of Provisional Application Ser. No. 60/083,644, filed Apr. 30, 1998.

TECHNICAL FIELD OF THE INVENTION

This invention relates in general to a monitoring apparatus and, more particularly, to a monitoring apparatus in which an image from a video camera can be viewed at a remote location.

BACKGROUND OF THE INVENTION

A surveillance or monitoring apparatus often uses at least one video camera, and the resulting images may be viewed at a remote location. For example, an industrial facility may have several video cameras at various locations throughout the facility, and each camera may be coupled to a respective video screen at a central security station operated by a single guard.

There are now video cameras which can be coupled to a computer, and there are software programs capable of converting video images from such cameras into a document in hypertext mark-up language (HTML) format, or in other words a document compatible with the Internet standard known as the World Wide Web (WWW). Further, personal communication devices such as cellular phones, pagers and personal digital assistants are becoming increasingly popular commercial products, as wireless communication technology becomes widespread and affordable. In fact, there is now a portable phone which has a small video display, and which includes a WWW-compatible browser that permits the portable unit to download and display HTML documents from the Internet.

At the same time, home security systems have become more common. However, even the most sophisticated home security systems are limited by rudimentary provisions for remote access by the property owner. Further, false alarms are relatively common. Even if the owner is made aware of the alarm, there is no convenient and cost-effective way for the owner to determine whether it is a false alarm. For example, existing systems may notify an owner of a possible break-in or other event through an automated phone call or page message, but the owner has no way of verifying whether there is a real problem or merely a false alarm.

While these existing monitoring systems have been generally adequate for their intended purposes, they have not been satisfactory in all respects. For example, and as mentioned above, even if an owner is notified by a page or telephone call of a problem or other event of interest, there is no convenient way for the owner to determine whether the event represents a true problem or just a false alarm, still less from virtually any remote location. Further, existing systems do not allow the camera operation to be adjusted from virtually any remote location.

SUMMARY OF THE INVENTION

From the foregoing, it may be appreciated that a need has arisen for a cost-effective method and apparatus for monitoring which permit access and/or control from virtually any remote location.

According to one form of the present invention, a detector periodically detects an image of a monitored area, a system receives the detected image, a portable unit has a display, and a wireless communication link facilitates communication between the system and the portable unit, including transmission of the detected image from the system to the portable unit. The portable unit presents the detected image on the display. The system detects an occurrence of an event of interest in the monitored area, and automatically transmits to the portable unit through the wireless communication link an indication of the occurrence of that event.

According to a different form of the present invention, a detector periodically detects an image of a monitored area, a system receives the detected image, a portable unit has a display and an operator input portion, and a wireless communication link facilitates communication between the system and the portable unit, including transmission of the detected image from the system to the portable unit. A control section is coupled to the system and can adjust a predetermined characteristic of the image detected by the detector. The portable unit presents the detected image on the display, permits an operator to use the operator input portion to specify a change in the predetermined characteristic, and transmits to the control section through the wireless communication link and system an indication of the specified change in the predetermined characteristic. The control section responds to the indication received from the portable unit by effecting the specified change in the predetermined characteristic.

According to yet another form of the present invention, a first detector periodically detects an image of a monitored area, a second detector periodically detects an image of a monitored area, a system receives the detected images from each of the detectors, a portable unit has a display and an operator input portion, and a wireless communication link facilitates communication between the system and the portable unit. The portable unit permits an operator to identify one of the first and second detectors as a currently selected detector, and transmits to the system through the wireless communication link an indication of the currently selected detector. The system responds to the indication received from the portable unit by transmitting to the portable unit through the wireless communication link the detected image from the currently selected detector, and the portable unit presents on the display the detected image from the currently selected detector.

According to still another form of the present invention, a detector periodically detects an image of a monitored area, and a system receives and processes a detected image from the detector in order to obtain a processed image. A portable unit has a display, and a wireless communication link facilitates communication between the system and the portable unit, including transmission of each of the processed images from the system to the portable unit. The portable unit successively presents the processed images on the display, the processed images having a resolution which is less than a resolution of the detected images, and which corresponds to a resolution of the display.

BRIEF DESCRIPTION OF THE DRAWINGS

A better understanding of the present invention will be realized from the detailed description which follows, taken in conjunction with the accompanying drawings, in which:

FIG. 1 is a diagrammatic view of a monitoring apparatus which embodies the present invention, the monitoring apparatus including two video cameras, a system which processes video images from the cameras, and a portable unit which is coupled to the system through a wireless link;

FIG. 2 is a high-level flowchart of image processing techniques used by the apparatus of FIG. 1;

DETAILED DESCRIPTION OF THE INVENTION

Figure 3:
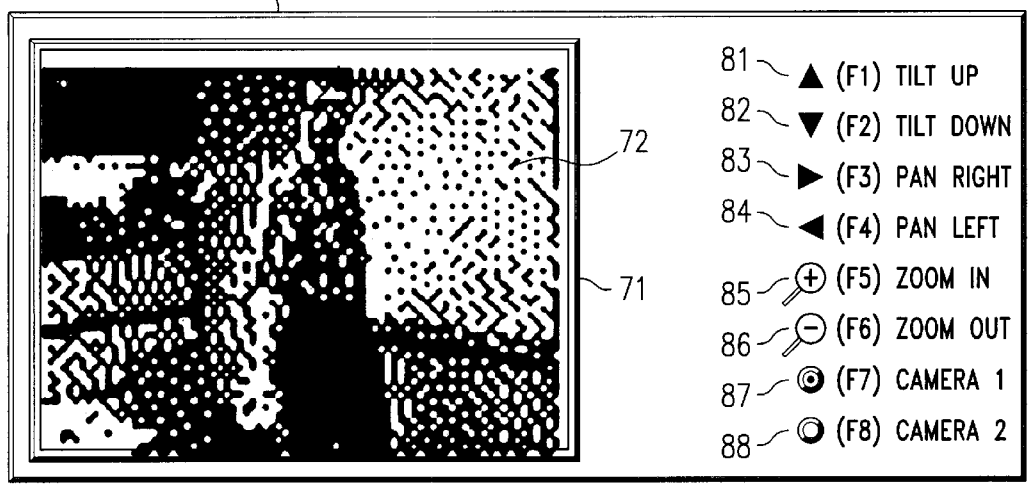
FIG. 3 is a diagrammatic view of an exemplary. screen image presented on a display of the portable unit of FIG. 1.

FIG. 1 is a diagrammatic view of a monitoring apparatus 10 which embodies the present invention. The monitoring apparatus 10 is used to monitor activities in one or more regions or areas of interest. For example, the monitoring apparatus 10 might be used at a residence to monitor activity in one or more rooms, in the yard, at the front door, and/or in the driveway. It could also be used for monitoring one or more areas in a commercial or industrial facility.

The monitoring apparatus 10 includes two image detectors 12 and 13, which in the disclosed embodiment are video cameras of a known type. The video cameras 12 and 13. each include a not-illustrated charge coupled device. (CCD) sensor, and a not-illustrated zoom lens assembly for adjusting the field-of-view of the image focused on the CCD sensor. The video cameras 12 and 13 may provide different views of the same monitored area, or may each provide a view of a completely different monitored area.

The video cameras 12 and 13 each include a respective control section 16 or 17. The control sections 16 and 17 are each capable of automatically controlling the. zoom setting of the zoom lens assembly in. the associated video camera 12 or 13. Further, the control sections 16 and 17 each include a physical support for the associated video camera, which can effect automated adjustment of the physical orientation of the associated video camera 12 or 13. In other words, with reference to a detected image of the monitored area, the control sections 16 and 17 can each adjust the orientation of the associated camera 12 or 13 up, down, left or right, so that the detected image is adjusted upwardly, downwardly, leftwardly, or rightwardly within the monitored area.

The monitoring apparatus 10 also includes a sensor 19 that can detect an event of interest in an area monitored by at least one of the cameras 12 and 13. In the disclosed embodiment, the sensor 19 is similar to those used in systems which automatically open doors for customers at retail establishments. In particular, the sensor 19 is a passive infrared sensor capable of detecting a heat source within the area it monitors, including the presence of a human or animal.

The monitoring apparatus 10 further includes a system 22, which has therein a computer 24. The computer 24 may be a personal computer which includes a processor, and which includes a memory device such as a hard disk drive.

A video connection 26 is provided between the video: camera 12 and the computer 24, in order to supply video images from the video camera 12 to the computer 24. A similar video connection 28 is provided from the video camera 13 to the computer 24. Control lines 27 are provided from the computer 24 to the control section 16 of the video camera 12, in order to provide the control section 16 with information that determines how the control section 16 will position the video camera 12, and how the control section 16 will set the zoom factor of the zoom lens assembly in the camera 12. A similar set of control lines 29 is provided from the computer 24 to the control section 17 of the video camera 13. The infrared sensor 19 has an output 31 which is coupled to the computer 24.

The system 22 further includes a cellular base station 36 of a known type which is used for communicating with cellular (wireless) telephones. The computer 24 is operatively coupled to the base station 36 by a network 38 which includes the Internet, and which may include one or more other networks such as a local area network, a wide area network, and so forth. The network 38 is coupled to a not-illustrated network interface card provided in the computer 24. Since the network 38 includes the Internet, it is capable of transmitting information in the Internet format known as the World Wide Web (WWW), where documents called web pages are transferred between. computers in a standardized format known as hypertext mark-up language (HTML) format.

The system 22 also includes a telephone line or system 41, which is coupled at one end to a not-illustrated modem in the computer 24, and at its other end to the cellular base station 36.

The monitoring apparatus 10 further includes a portable communication unit 46, which is a cellular (wireless). telephone, and which, also includes some. additional capability, as discussed below. The portable. unit 46 in the disclosed embodiment may be a unit which is available under the tradename NOKIA 9000 from NOKIA in Irving, Tex. The portable unit 46 has an antenna 48, which facilities wireless communication with the base station 36 through a radio frequency (RF) cellular telephone link 49.

The portable unit 46 has an LCD display 51 capable of. displaying two-dimensional video images at a low resolution. Further, the portable unit 46 has a plurality of buttons or keys, one of which is indicated at 52. A operator can use these keys to input information into the portable unit 46. The keys include an alpha-numeric keyboard which has a "QWERTY" format similar to that found on personal computers, and include several function keys.

The monitoring apparatus 10 has the capability to take a video image detected by one of the video cameras 12 or 13, carry out some image processing on the detected image within the computer 24, transmit the resulting processed image to the portable unit 46 through the network 38, the base station 36, and the wireless link 49, and present the processed image on the display 51 of the portable unit 46. In the disclosed embodiment, the image processing carried out by the computer 24 includes steps which are explained below with reference to FIG. 2.

In this regard, each of the video cameras 12 and 13 is capable of producing successive images at a speed and resolution which represents more information than can be transmitted through the wireless link 49. For example, even an inexpensive video camera can generate 30 frames or images per second, which each have a resolution of 320 by 240 gray-scale pixels. To transmit the data representing all of these pixels, a throughput of about 18 million bits per second would be needed. Existing wireless cellular links, such as that at 49. in FIG. 1, can sustain a nominal throughput of about 9600 bits per second, or in other words about 1/2000 of the total video information. produced by the video camera.

A further consideration is that existing portable. units, such as that shown at 46 in FIG. 1, have low-resolution monochrome displays. That is, the resolution of a display such as that shown at 51 is limited to about 160 by 120 pixels for a video image, where each pixel is either on or off,. or in other words is a selected one of two different colors such as black and white.

For these reasons, the images from the video cameras 12 and 13 in FIG. 1 are subjected by the computer 24 to image processing, which is depicted diagrammatically in FIG. 2. FIG. 2 is a flowchart showing successive image processing steps 61–63. The first step 61 is temporal sampling, which involves selecting a subset of the images produced by a given video camera. For example, of the 30 or so frames or images produced by a video camera every second, two of these frames or images may be selected for image processing, and the others may be discarded.

Then, at block 62, spatial sampling is carried out. In other words, subsampling is carried out in order to reduce the resolution of each of the images selected at 61. For example, each frame or image may be reduced to about 80 by 60 pixels.

Then, at block 63, a dithering process is carried out, in order to reduce the data representing each pixel to a single bit. That is, the bit associated with each pixel indicates whether that pixel is on or off. Stated differently, each pixel has one of two different colors, such as black and white. The dithering process sets the state of each pixel of the processed image based on the states of several pixels of the spatially sampled image, using a known technique. In the disclosed embodiment, the sampling and dithering carried out at blocks 61–63 of FIG. 2 will reduce the video output to 9600 bits per second.

In the disclosed embodiment, the computer 24 takes the images that are processed according to the techniques discussed above in association with FIG. 2, and successively inserts these processed images into a document or web page which is in HTML format, and which can thus be accessed through the Internet. In this regard, the portable unit 46 includes a manufactured-installed browser program, which is capable of accessing, downloading and displaying on the display 51 an HTML page or. document obtained through the network 38 from the computer 24.

FIG. 3 shows an example of how the display 51 of the portable unit 46 might present an HTML page generated by the computer 24. An image 71, which has been sampled and dithered according to steps 61–63 of FIG. 2, is presented on the left side of the display 51. As discussed above, this is a monochrome (two-color) image, with a low resolution of 60 by 90 pixels. Nevertheless, it is sufficient to permit visual detection of the presence of a person in the field-of-view, for example the person indicated at 72 in the image 71.

To the right of the image 71, the HTML page includes eight icons, which are identified with reference numerals 81–88. To the right of each icon is a parenthetical expression in the form of "(FX)", where X is an integer. To the right of each parenthetical expression is a label identifying the function of the associated icon. Each parenthetical expression identifies on the portable unit 46 a function key which will cause the associated function to be effected. The icons 87 and 88 relate to the capability of the operator to select one of the two video cameras 12 and 13. If the operator presses the function key F7 associated with icon 87, an associated HTML. link back to the WWW server program in computer 24 will cause the computer 24 to designate the first video camera 12 as the selected video camera. The computer 24 will then ignore the output of the second video camera 13, will subject only the output of the video camera 12 to the image processing. described above in association with FIG. 2, and will forward to the portable unit 46 only the processed images obtained from the selected video camera 12. On the other hand, if the operator pressed the function key F8 associated. with the icon 88, the. second video camera 13 will be designated as the selected camera, the video images from the camera 13 will be subjected to the image processing described above in association with FIG. 2, and only the processed images from the camera 13 will be forwarded to the portable unit 46.

The icon 81 is an upwardly pointing arrowhead. If the operator pressed the function key F1 associated with the icon 81, an HTML link back to the WWW server program in the computer 24 will cause the computer 24 to output control signals at either 27 or 29 to the control section 16 or 17 in the currently selected video camera 12 or 13. These control signals will cause the control section 16 or 17 for the selected camera to tilt the orientation of the camera, so that the image associated with that camera moves upwardly in terms of its view of the area being monitored. Similarly, if the operator presses a respective one of the function keys F2, F3 or F4, which are respectively associated with icons 82–84, the selected camera 12 or 13 will be adjusted respectively down, right or left.

If the operator presses the function key F5 associated with the icon 85, an associated HTML link will cause the computer 24 to output control signals at 27 or 29 to the control section 16 or 17 of the selected video camera. These control signals will cause the zoom lens assembly in the selected video camera 12 or 13 to increase its magnification level in a manner commonly known as a zoom-in function. Alternatively, if the operator presses the function key F6 associated with the icon 86, its HTML link will cause the zoom lens assembly in the selected video camera to decrease its magnification level, in a manner commonly known as a zoom-out function.

If the portable unit 46 has a mouse-like pointing device, such as a small trackball, the operator can use the pointing device to select and "click" on any one of the icons 81–88, in order to effect the associated function. Similarly, if the operator happens to be accessing this HTML page from some other remote computer, and if that computer has a mouse, the operator can click directly on the icons 81–88.

As discussed above, the infrared sensor 19 is capable of detecting the presence, within its field-of-view, of a heat source such as a human or animal. When the sensor 19 outputs a signal at 31 to indicate that it has detected the presence of such a heat source, the computer 24 responds by using its not-illustrated modem to place a telephone call to the telephone in the portable unit 46, namely through the telephone line 41, the base station 36 and the wireless link 49. This notifies the person or operator possessing the portable unit 46 that something is happening in the remote area being monitored by the system 10 of FIG. 1. The operator may then use the browser provided in the unit 46 to access and download the HTML page generated by the computer 24, in order to obtain a screen display like that shown in FIG. 3, so that the operator can view the image 71 and determine what is happening in the monitored area.

Figure 4A:
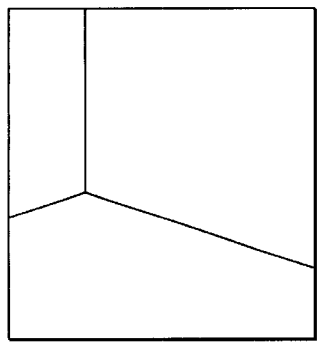
FIGS. 4A–4C are respective diagrammatic views of video images, which demonstrate how video images are processed by the apparatus of FIG. 1.
Figure 4B:
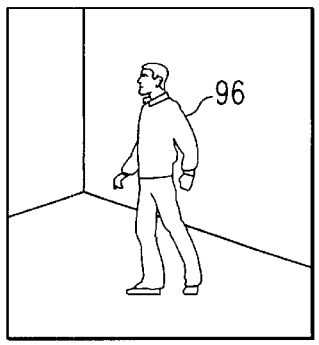

Alternatively, it would be possible to omit the sensor 19, and to have the computer 24 detect the occurrence of an event of interest by appropriate processing of the raw video images received from either of the video cameras 12 and 13. For example, FIG. 4A is a diagrammatic view of an image of a monitored area produced by the video camera 12. In this case, the monitored area happens to be the corner region of a room. FIG. 4B is a subsequent image from the same camera, which was taken after a person 96 had walked into the monitored corner of the room.

The current image in FIG. 4B can be compared to the prior reference image of FIG. 4A, in order to determine whether the current image differs in any significant way from the reference image. For example, this comparison can be carried out on a pixel-by-pixel basis by first determining the absolute value of the difference between the gray-scale color values for each pixel, and by then comparing the result to a threshold value. If the absolute value of the difference for a given pixel is less than the threshold value, then the pixel is turned off. On the other hand, if the absolute value of the difference is above the threshold value, then the pixel is turned on.

Figure 4C:
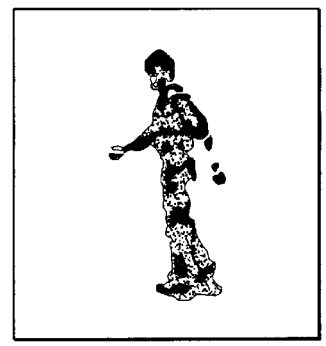

The result is a monochrome (two-color) image, such as that shown in FIG. 4C. In FIG. 4C, there are a group of pixels at 97 which correspond to the person 96, and which have been turned on to indicate that something has changed relative to the reference image of FIG. 4A. This condition can be used to trigger a telephone call from the computer 24 to the portable unit 46. It should be evident that, while the infrared sensor 19 detects heat, the alternative approach described in association with FIG. 4 detects motion or a change in the video image, rather than the presence or absence of heat.

In the disclosed embodiment, the image processing described in association with FIG. 2 does not include the use of video compression techniques. However, it will be recognized that the computer 24 of FIG. 1 could be provided with hardware and/or software capable of performing a known video compression technique, and that the portable unit 46 could be provided with the capability to decode the compressed video information for purposes of display. For example, video compression could be effected according to the standard known as MPEG-4. In the event that video compression was provided in this manner, it would increase the amount of video information which could be transmitted in real-time from the computer 24 to the portable unit 46. Consequently, the image processing described in association with FIG. 2 could be adjusted to increase the number of images processed and transmitted per second, and/or to increase the resolution of the processed images.

The present invention provides a number of technical advantages. One such technical advantage is that the wireless link to a portable unit allows the monitored area to be viewed from almost any remote location and at any convenient time. Moreover, it allows the camera position and/or operation to be adjusted from that remote location. Another advantage is that the occurrence of an event of interest in the monitored area can be detected, and an indication of the detection of this event can be automatically sent to the portable unit. The person in possession of the portable unit can then access images from a camera in the monitored area, in order to determine whether there is in fact a problem which requires attention. If there is no problem, the person could make a telephone call, or otherwise use the portable unit to prevent the automatic transmission of a message to the police, the fire department, a security agency, or the like.

Still another advantage is that the information from the video cameras is provided in a document in HTML format, which can be easily accessed from the portable unit, or from any convenient computer having a WWW-compatible browser. Yet another advantage results from the use of image processing techniques to conform the amount of video information to a level which is compatible with the. available bandwidth of a wireless link and which is compatible with the available resolution of the portable unit, while still providing at the portable unit an image that has sufficient resolution to permit detection of the presence of a person or an object in the monitored area.

Although one embodiment has been illustrated and described in detail, it should be understood that various changes, substitutions and alterations can be made therein without departing from the scope of the present invention. For example, although the disclosed embodiment has two separate video cameras, it will be recognized that only one camera could be provided, or that more than two cameras could be provided. As another example, the disclosed embodiment uses gray-scale video cameras, but it will be recognized that color video cameras could also be used. Further, although the disclosed embodiment uses image detectors which are video cameras, it will be recognized that there may be applications where a different type of image detector would be appropriate, for example a two-dimensional staring array infrared detector.

As still another example, the supplemental sensor provided in the disclosed embodiment is an infrared sensor, but it could be some other type of sensor, such as a photocell, a microphone, or the like. Also, even though the disclosed embodiment responds to an output signal from the infrared sensor by placing a telephone call to the telephone in the portable unit, it will be recognized that this information could be transmitted to the portable unit in some alternative manner, for example by sending a pager message to a pager circuit in the portable unit. Other changes, substitutions and alterations are possible, without departing from the spirit and scope of the present invention, as defined by the following claims.

What is claimed is:

1. An apparatus, comprising:
   a detector operative to periodically detect an image of a monitored area;
   a system operative to receive the detected image from said detector;
   a portable unit having a display; and
   a wireless communication link which includes portions of said system and said portable unit and which is operative to facilitate wireless communication between said system and said portable unit, including transmission of the detected image from said system to said portable unit;
   said portable unit being operative to present the detected image on said display; and
   said system being further operative to detect an occurrence of an event of interest in the monitored area, and to automatically transmit through said wireless communication link to said portable unit an indication of the occurrence of the event of interest.

2. An apparatus according to claim 1, wherein the event of interest is detected through image processing of a succession of the images detected by said detector.

3. An apparatus according to claim 1, including a sensor which is separate and independent from said detector and which monitors said area, said sensor producing an output signal in response to the occurrence of the event of interest, and said system being operative to effect the transmission of the indication of the occurrence of the event in response to the output signal from said sensor.

4. An apparatus according to claim 3, wherein said sensor is an infrared sensor.

5. An apparatus according to claim 1, wherein said portable unit includes a telephone, said wireless communication link includes a wireless telephone link, and the transmission of the indication is effected by placing a telephone call through said wireless telephone link to said telephone in said portable unit.

6. An apparatus according to claim 1, wherein said system includes a computer which integrates the detected image into a hypertext markup language document, and includes a computer network operatively coupled to said computer, said wireless communication link communicating with said computer through said computer network; and wherein said portable unit includes a network browser which is operative to retrieve the hypertext markup language document from said computer through said wireless communication link and said computer network, and to present the document and the image therein on said display.

7. An apparatus, comprising:
a detector operative to periodically detect an image of a monitored area;
a system operative to receive the detected image from said detector;
a portable unit having a display and having an operator input portion;
a wireless communication link which includes portions of said system and said portable unit and which is operative to facilitate wireless communication between said system and said portable unit, including transmission of the detected image from said system to said portable unit; and
a control section coupled to said system and operative to adjust a predetermined characteristic of the image detected by said detector;
said portable unit being operative to present the detected image on said display, being operative to permit an operator to use said operator input portion to specify a change in the predetermined characteristic, and being operative to transmit to said control section through said wireless communication link and said system an indication of the specified change in the predetermined characteristic; and
said control section being operative to respond to the indication received from said portable unit by effecting the specified change in the predetermined characteristic.

8. An apparatus according to claim 7, wherein the predetermined characteristic is an orientation of said detector with respect to the monitored area, said control section being operative to change a physical position of said detector relative to the monitored area in response to the indication received from said portable unit.

9. An apparatus according to claim 8, wherein the predetermined characteristic is a field of view of said detector with respect to the monitored area, said control section being operative to change the field of view of said detector relative to the monitored area in response to the indication received from said portable unit.

10. An apparatus, comprising:
a first detector operative to periodically detect an image of a monitored area;
a second detector operative to periodically detect an image of a monitored area;
a system operative to receive the detected images from each of said first and second detectors;
a portable unit having a display and having an operator input portion; and
a wireless communication link which includes portions of and which is operative to facilitate wireless communication between said system and said portable unit;
said portable unit being operative to permit an operator to identify one of said first and second detectors as a currently selected detector, and being operative to transmit to said system through said wireless communication link an indication of the currently selected detector;
said system being operative to respond to the indication received from said portable unit by transmitting to said portable unit through said wireless communication link the detected image from the currently selected detector; and
said portable unit being operative to present on said display the detected image from the currently selected detector.

11. An apparatus, comprising:
a detector operative to periodically detect an image of a monitored area;
a system operative to receive a detected image from said detector, and to process the detected image in order to obtain a processed image;
a portable unit having a display; and
a wireless communication link which includes portions of said system and said portable unit and which is operative to facilitate wireless communication between said system and said portable unit, including transmission of each of the processed images from said system to said portable unit;
said portable unit being operative to successively present the processed images on said display as they are received, said processed images having a resolution which is less than a resolution of the detected images and which corresponds to a resolution of said display.

12. An apparatus according to claim 11, wherein said system is operative to select a subset of the detected images produced by said detector, and to carry out the image processing only on the detected images which are selected for said subset.

13. An apparatus according to claim 12, wherein said system is operative to carry out the image processing by reducing the resolution of each of the detected images in said subset.

14. An apparatus according to claim 11, wherein the pixels of the processed image each have one of two predetermined colors which are different.

15. An apparatus according to claim 1, wherein:
said system is further operative to form a compressed image from said periodically detected images, whereby said wireless communication link transmits said compressed image from said system to said portable unit.

16. An apparatus according to claim 15, wherein:
said system forms said compressed image by temporal sampling of said detected image by selection of a subset of said periodically detected images.

17. An apparatus according to claim 15, wherein:
said system forms said compressed image by spatial sampling of said detected image by selection of a subset of pixels of said detected image.

18. An apparatus according to claim 15, wherein:
said system forms said compressed image by dithering of said detected image by selection of either black or white for each pixel of said detected image.

* * * * *